Aug. 11, 1964
S. LARKIN
3,144,054
MACHINES FOR MAKING WIRE MESH
Filed Nov. 2, 1962
2 Sheets-Sheet 1
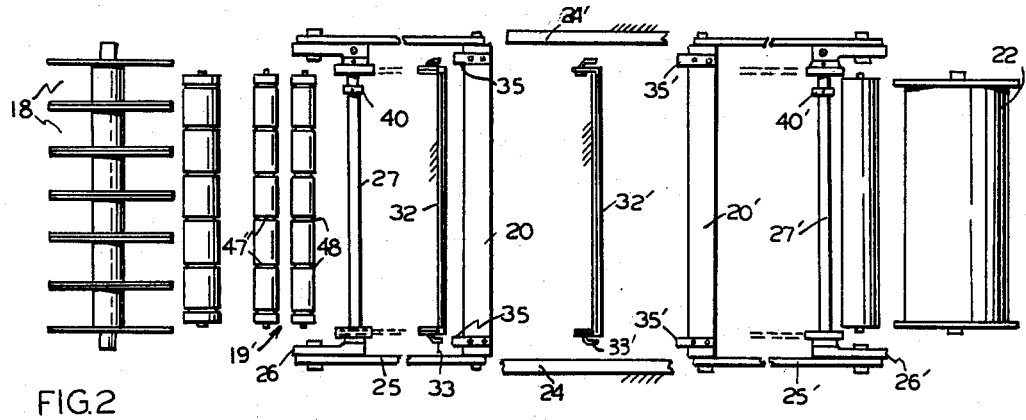
FIG.2
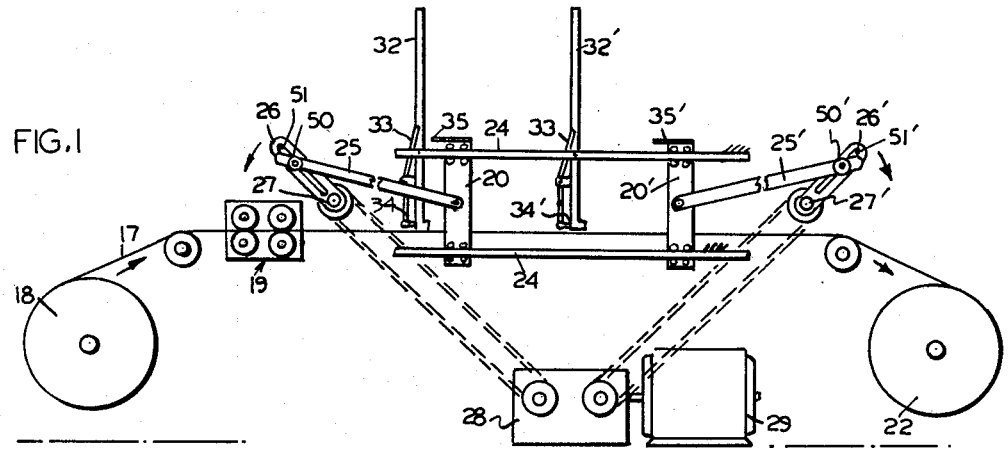
FIG.1
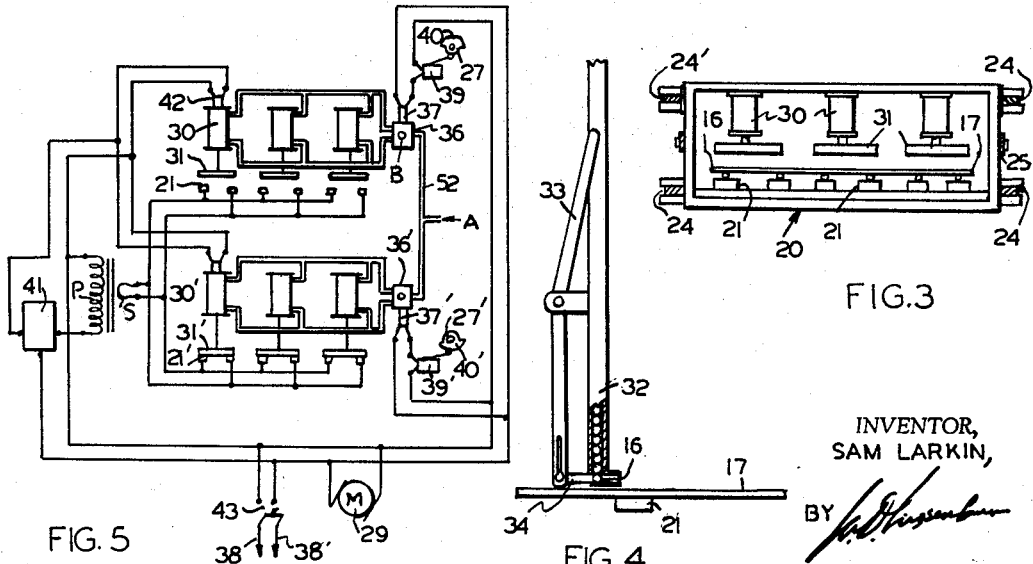
FIG.5
FIG.4
FIG.3
INVENTOR,
SAM LARKIN,
BY
ATTORNEY

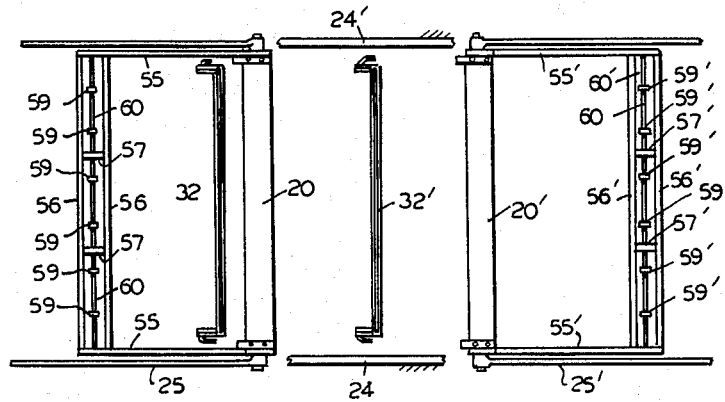
FIG.7
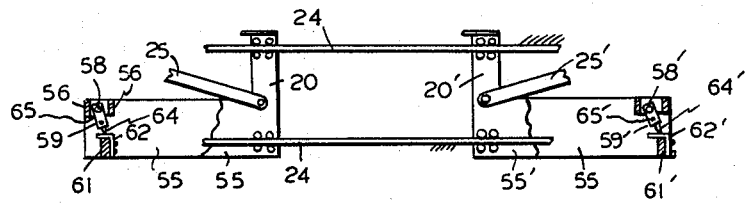
FIG.6
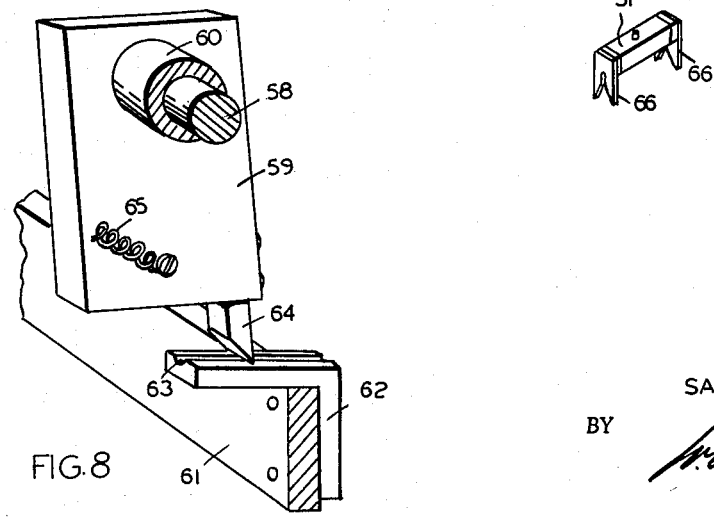
FIG.9
FIG.8
INVENTOR,
SAM LARKIN,
BY
ATTORNEY.

United States Patent Office 3,144,054
Patented Aug. 11, 1964

3,144,054
MACHINES FOR MAKING WIRE MESH
Sam Larkin, 254 Beach 140th St., Belle Harbor, N.Y.
Filed Nov. 2, 1962, Ser. No. 235,604
9 Claims. (Cl. 140—112)

The present invention relates to automatic machinery for making wire mesh in which the transverse wires as they are commonly called, are laid in spaced relation across a series of spaced wires arranged as warp, and then welded thereto. This mesh, for example when made of relatively heavy wires, is adapted to be incorporated in concrete structures to be imbedded therein.

Heretofore, there have been machines in which the transverse wires are fed successively in spaced relation onto the warp wires and then welded thereto by resistance welding apparatus, one transverse wire at a time, at a fixed welding station while the warp wires had to be at rest until the welding was completed. Then the warp is advanced to have the next transverse wire at the welding station for a repetition of the welding operation. In such machines, much of their operating time is unproductive and the many repeated starts and stops of much of the mechanism involved, imposed a rather slow machine movement. There have also been machines in which a plurality of transverse wires are simultaneously welded to the warp wires. These had all the faults of the others though production was increased, but it is apparent that in such machines, the welding transformer need be of double or greater capacity for the required performance.

It is therefore the principal object of this invention to provide a novel and improved automatic machine for making wire mesh by means avoiding the foregoing objectionable features heretofore encountered, which utilizes a substantially constantly moving warp, transforms lost time into productive time and substantially increases the production. When the junctures are made by welding electrically, the necessary welding apparatus need be sufficient for only one welding station.

Another object of this invention is to provide a novel and improved automatic mesh-making machine of the character mentioned, which is adjustable to make mesh with different size openings, but all uniform in any particular run, and if desired, is also adjustable to make mesh, the dimension of alternate openings in which are identical along the warp, but the dimension of successive openings along the warp, are different.

A further object thereof is to provide a novel and improved automatic mesh-making machine having the mentioned attributes, which is simple in construction, easy to understand and adjust, reasonable in cost to manufacture and efficient in carrying out the purposes for which it is designed.

Other objects and advantages will become apparent as this disclosure proceeds.

This application is a continuation-in-part of my pending patent application filed on June 26, 1962, under Serial No. 205,444, which has been abandoned upon the filing of this application.

For the practice of this invention, one form the machine may assume, is to have accommodation for a series of spaced wires arranged as warps, between straightening means which receives them off from supply reels at the front end of the machine, and a wind-up reel at the rear or discharge end of the machine. There are two carriages, one opposite the other, each of which may be a rectangular frame positioned upright across the warp and mounted for sliding movement along a horizontal track means in the direction of the warp. These carriages are associated with mechanism which in operation, reciprocates them to move continuously in opposite directions along the track. The warp wires are through said frames. On the lower rung, each frame has fixed welding electrodes on which said wires rest. The upper rung of each frame carries pneumatically-operated rams having thereon the movable electrodes. In the space which is between the carriages when they are nearest each other, there is a hopper to feed transverse wires one at a time onto said warp wires at the fixed electrodes of that carriage which is nearest discharge end of the machine. There is another hopper to similarly serve the other carriage when the carriages are furthest apart. Hopper operation may be effected by trip fingers on the carriages. Warp feed is effected by the clamping action of the electrodes or other means on the respective carriages and the movement of the carriages towards the discharge end of the machine. Since welding occurs on one carriage at a time, the transformer offering the welding current may be just for that. Timing means controls the length of the welding operation during carriage travel and there are means to control the pneumatic system in proper timed relation during each cycle of machine operation. Means may also be provided to adapt the machine to make mesh of different size openings.

In the accompanying drawings forming a part of this specification, similar characters of reference indicate corresponding parts in all the views.

FIG. 1 is a diagrammatic longitudinal view of an automatic wire mesh making machine embodying teachings of this invention. All framework is omitted, except such parts as are necessary to explain the construction. Also, to attain clarity of illustration, various details are omitted in this view, which appear in other views.

FIG. 2 is a diagrammatic top plan view of FIG. 1.

FIG. 3 is an end view of one of the carriages through which the warp wires pass. Each carriage serves as a station on which the weft wires are joined to the warp wires, and in this embodiment such is effected by electric welding apparatus, whose electrodes afford a clamping action to cooperate with carriage movement, to feed the warp wires. A weft wire is shown on the warp wires, ready to be welded thereto.

FIG. 4 is an enlarged, fragmentary, partly sectional view showing one of the hoppers, ready to have a transverse, meaning a weft wire ready to be discharged onto the warp wires across a carriage.

FIG. 5 is a diagrammatic representation of the pneumatic and electrical systems used on the embodiments of the machine here illustrated.

FIG. 6 is a fragmentary longitudinal view of the machine showing additional structure on each of the carriages. In particular, such addition comprises pawl means on each carriage to cooperate therewith to feed the warp wires. The hoppers are omitted in this view.

FIG. 7 is a top plan view of FIG. 6, with parts omitted to attain clarity of illustration. The hoppers are included in this FIG. 7.

FIG. 8 is an enlarged perspective view of one of the pawl means and its associated wire support.

FIG. 9 is a perspective view showing a locating means for the transverse wires.

In the drawing, the numeral 15 designates generally a machine of preferred construction which makes wire mesh by welding spaced transverse wires as 16 onto a series of spaced warp wires 17. These warp wires come off supply reels 18 at the front end of the machine, pass through straightening rollers 19, thence across two carriages indicated generally as 20 and 20' where such warp wires rest on the stationary welding electrodes which are indicated as 21 on the carriage 20, and 21' on the carriage 20', and thence to a wind-up reel 22 which receives the finished mesh at the rear end of the machine. These carriages 20, 20' are mounted for sliding movement along the direction of the warp wires 17, on tracks 24, 24′, and in operation, reciprocate in opposite directions with identical scopes of movement, which is afforded by the connecting rods 25, 25′ in association with the cranks 26, 26′ on the journalled shafts 27, 27′ respectively, which shafts are driven at like speeds in opposite directions from the output shafts of a reduction gear box 28 powered by the motor 29. Each of said carriages is a vertically positioned rectangular frame on whose lower rung are the stationary welding electrodes, and whose upper rungs carry air cylinders 30, 30′ respectively. At the bottom ends of the rams of the air cylinders 30, are the movable welding electrodes 31, so called, which cooperate with the electrodes 21. At the bottom ends of the rams of the cylinders 30′, are the movable electrodes 31′ which cooperate with the welding electrodes 21′. In the embodiment illustrated which is a series resistance welding system, the members 31, 31′ are not truly electrodes; all connections from the secondary winding S of the transformer being to the electrodes 21, 21′ as shown in the wiring diagram.

A transverse wire 16 is fed from a hopper 32 onto the electrodes 21, every time the carriage 20 is at the end of its travel towards the front end of the machine. A transverse wire is fed from the hopper 32′ onto the electrodes 21′, every time the carriage 20′ is at the end of its travel towards the front end of the machine. As soon as a transverse wire is discharged, the air cylinders of the carriage it has come to, operate so it becomes clamped by the associated stationary and movable welding electrodes on such carriage. Contact of the work by the electrodes under sustained pressure for a period of time, causes the work parts to be welded if during such time the transformer T of the welding circuit, is actuated. Movement of the carriage while the work is clamped, will pull the work towards the rear end of the machine. It is evident that the work is being moved towards take-up, substantially during one-half of the time by one carriage and substantially during the other half of the time by the other carriage, in each cycle of operation; the work-pulling carriage at any instant, being that on which welding occurs.

To effect discharge of a transverse wire from a hopper, each carriage here has a trip finger to shift a spring-loaded lever on the hopper, which in turn shifts a discharge plunger. Of the hopper 32, such lever is 33 and the associated discharge plunger is 34, while the trip finger on the carriage 20 is indicated at 35. Of the hopper 32′, the lever is 33′ and the associated discharge plunger is indicated at 34′. The other trip finger is 35′.

To have the machine make wire mesh whose transverse wires are equally spaced, the distance between the positions on the carriages where transverse wires are set thereon respectively, when the carriages are nearest each other, should be equal to such spacing, and the scope of travel to each of the carriages, namely 20, 20′, should be equal to such spacing.

A system for the control of the operation of this machine 15, is shown in FIG. 5, will now be explained. Here, all the air cylinders are of the double-acting type. All the cylinders 30 on the carriage 20, are connected in parallel and controlled by the solenoid-operated valve 36. All the cylinders 30′ on the carriage 20′, are connected in parallel and controlled by the solenoid-operated valve 36′. The solenoids are indicated respectively at 37 and 37′. They receive current from the main power lines 38, 38′. In the circuit of the solenoid 37, there is a micro-switch 39 controlled by a cam 40 on the crank shaft 27. In the circuit of the solenoid 37′, there is a micro-switch 39′ controlled by the cam 40′ on the crank shaft 27′. When a solenoid is inactive, the condition of the associated valve is such that compressed air constantly supplied thereto from A, will be led into the line of the lower ports of the associated cylinders while the line connecting the upper ports of such cylinders will be connected to atmosphere at B. In such condition, the rams of the cylinders will be upward. Upon actuation of a solenoid, the supply of the compressed air will be led into the line of the upper ports of the associated cylinders while the line connecting the lower ports of such cylinders will be connected to the atmosphere at B. In such condition, the rams of the cylinders will be downward. The cams 40, 40′ are so arranged that on the carriage which is moving towards the discharge end of the machine, the rams of the cylinders shall be in downward position, and that the rams of the cylinders on the carriage which is moving towards the front end of the machine, shall be in upward position.

I have chosen a welding system in which a bar as 31 is brought down onto a transverse wire 16 to press it against two warp wires 17, 17′ as shown in FIG. 3; said warp wires resting respectively on members 21, 21″ which are the actual electrodes connected to the terminals of the secondary winding S of the transformer T. Although I have called the members 31, 31′ upper electrodes, they are not actually so in this set up which is well known in the resistance welding art. Other arrangements for welding may be employed to secure a transverse wire to the warp wires, and such are well known, and evident to those versed in the art without further illustration. Therefore, in the welding system which I show here, alternate electrodes of the series 21, 21′ are connected to one terminal of the secondary winding S, while the remaining ones of said two series are connected to the other secondary terminal.

The primary winding P of the transformer is actuated from the main power lines 38, 38′, but in its circuit is interposed an electrical timer 41 controlled by the pressure-actuated switches 42, 42′ which are connected in parallel. When any one of these last mentioned switches is closed, the said timer 41 allows current to pass through the primary P for a predetermined period which is just sufficient to accomplish welding during the first part of travel of a carriage towards the discharge end of the machine. Since the clamping action of the members 31, 31′ on the work, is relied on to feed the warp wires 17 with a transverse wire 16 during movement of a carriage towards the discharge end of the machine, and since the amount of such feeding need be the full scope of travel of the carriage moving towards discharge end in the embodiment illustrated in FIG. 1, the cylinder rams stay down during the full travel of the carriage so moving.

The mentioned pressure-actuated switches 42, 42′ are known devices which are mounted communicatively with the top end of one cylinder 30, and one cylinder 30′ respectively. When the pressure in the cylinder any such switch is associated with, reaches a predetermined amount, the switch closes. When the pressure in such cylinder falls below the prescribed minimum, the switch opens. Since these switches initiate actuation of the primary winding P, each one is to close only after sufficient pressure is built up in the cylinder related to it, to assure proper clamping of the work before current to weld is furnished, because proper welding action occurs only while the work is under sufficient pressure against the electrodes.

Let us presume that the machine is at rest in the condition shown in FIG. 1 and that the warp wires 17 are laced therethrough in a predetermined spaced relation, positioned through the carriages 20, 20′, on the electrodes 21, 21′ as in FIG. 3 after passing through the straightener means 19; the ends of said warp wires being anchored for wind up at 22 which latter is manually or power-driven as is well known in the art. The carriages 20, 20′ are yet to move apart for about the next one-eighth of a turn of the crank shafts 27, 27′. The hoppers 32, 32′ are filled with transverse wires 16. The rams of all the air cylinders 30, 30′ are upward. The switches 42, 42′ are open. The switch 39 is open. The switch 39′ is closed. The timer 41 is in condition in which the circuit of the primary winding P of the transformer T is open, such opening of the circuit having occurred at some point in the travel of the carriage 20' towards the discharge end of the machine 15. Of course, the main line switch 43 is open.

The machine 15 is now ready for operation, so the main line switch 43 is closed and the following happens. The solenoid 37' is actuated because the switch 39' is in closed condition. This will operate the cylinders 30' so that their rams are forced downward. Though the members 31' will contact the electrodes 21' since there is no transverse wire 16 on said electrodes, there is no current flowing from the transformer because the timer 41 is in open circuit condition. Also as soon as said main switch 43 is closed, the motor 29 commenced to run and hence the crank shafts 27, 27' started to turn in opposite directions whereby the carriages 20, 20' started to move apart. At the end portion of the travel of the carriage 20 towards the front end of the machine, the trip finger 35 thereon will contact and shift the lever 33, whereupon the plunger 34 will cause the ejection of a transverse wire 16 from the hopper 32, onto the warp wires 17 at the welding electrodes 21, and immediately upon contact of such transverse wire with the warp wires, the air cylinders 30 already having commenced operating, will have their rams lowered and said transverse wire so placed, will be speedily clamped to the warp wires by the member 31, because of the closing of the switch 39 by the cam 40 which caused such cylinder operation. The carriages 20, 20' are now of the end of their travel apart, so switch 39' will open, thereby deactuating the solenoid 37' and thereupon the air cylinders 30' will be operated so that their rams are brought upward. The carriages will now move towards each other, and here is what happens.

Upon build-up of pressure in the cylinders 30, the switch 42 will close and the timer 41 will be actuated so that for a portion of the movement of the carriage 20 towards the carriage 20', current will flow through the primary winding P of the transformer and hence the circuit of the secondary winding S will be actuated and so the transverse wire being held on the carriage 20, will be welded to the warp wires. Also to be noted is that for the entire movement of the carriage 20 towards the carriage 20', the warp wires 17 will be moved towards the discharge end of the machine. Upon the end of travel of the carriages towards each other, the cam 40 will cause the switch 39 to open, thus deactuating the solenoid 37, whereupon the rams of the cylinders 30 will rise. Also at such end of carriage travel, the trip finger 35' will have caused the ejection from the hopper 32', of a transverse wire onto the warp wires at the carriage 20', while the closing of the switch 39' by action of the cam 40' will have caused the transverse wire just set, to be clamped because the rams of the cylinders 30' moving downward. Now on movement of the carriages apart and upon build-up of pressure in the cylinders 30', the switch 42' will close and the timer 41 will be actuated so that for a portion of the movement of the carriage 20' away from the carriage 20, current will flow through the primary winding P of the transformer and hence the circuit of the secondary winding S will be actuated and so the transverse wire held on the carriage 20', will be welded to the warp wires. Also to be noted is that for the entire movement of said carriage 20' away from the carriage 20, the warp wires 17 will be moved towards the discharge end of the machine. This cycle of operation will automatically repeat itself as long as the machine is let to run and warp and transverse wires are supplied.

Of importance to note is that the warp wires are constantly being pulled towards the discharge end of the machine, that is, by the movement of the carriage 20 when the carriages move towards each other and by the carriage 20' while the carriages move apart, and that the transformer is called upon to do welding of the one transverse wire which is clamped on a carriage, first that transverse wire which is on one carriage and then the transverse wire which is on the other carriage. The length of stroke of each of the carriages being twice the distance they are apart when closest to each other; such latter meaning the distance that is between the stations on said carriages whereunto transverse wires sit alternately, the transverse wires of the resulting mesh will be equi-spaced such latter distance.

Such spacing of transverse wires can be altered by locating the pivots 50, 50' fixedly at different positions along the slots 51, 51' along the cranks 26, 26' respectively, and by adjusting the positions of the hoppers 32, 32' to suit. The spacing of the warp wires 17 can be altered, by making the guide roller 49 and the rollers of the straightening means 19 with more annular grooves than those shown as 47 and 48. Uneven spacing of the transverse wires can be accomplished by adjusting the scopes of travel of the carriages to be uneven.

There is an advantage in driving the carriages by the crank and connecting rod means here employed, because their movement is a simple harmonic motion for each of them. This gives a slight dwell period at the ends of their stroke to help the mounting of the newly fed transverse wires thereon respectively.

Though not shown in the drawing in order to attain clearness of illustration, the solenoid-operated valves 36, 36' may be mounted on the carriages 20, 20' respectively, and suitable electric cables will serve to effect the electrical connections, as well as a suitable hose 52 for connection to the valves 36, 36', and all such cables and hose shall be flexible and permit the required carriage movement. All this is readily understood to those versed in the machine art, without the necessity of further illustration, as well as that to accommodate the machine to various sizes of mesh openings, the connecting rods 25, 25' can be replaced by shorter or longer ones as may be required, or they may be of the type which are adjustable in length, adjustment of crank lengths by movement of the pivotal connections 50, 50' has been explained and provision may be made for adjusting the positions of the hoppers 32, 32' along the track. Although I have shown that the air cylinder means on the carriages, operate the welding apparatus and act as the feeders of the warp wires. It is evident that separate cylinders on each carriage may be provided to do the feeding only, by their clamping action coupled with carriage movement, or by way of further example, the automatic feeding of the warp wires may be accomplished by each carriage having thereon clamping means as shown in FIG. 6. Though I prefer that the warp and transverse wires be joined by welding, it is readily understandable to those versed in the mesh making art that mechanical joining means may be on each carriage in the practice of this invention.

Whether the wires 16 and 17 are joined by welding which is the preferred manner discussed herein, in which instance feeding of the warp is offered by the clamping action of the electrodes in conjunction with carriage movement in the embodiment FIG. 1, or where in the practice of this invention said wires are joined on the respective carriages 20, 20' by any mechanical method known in this art, I provide warp clamping means which may take the form as shown in FIG. 6, for positive action in all constructions of the machine. Thus, where welding is used, as herein for example, the clamping action of the electrodes is not relied on for warp feeding by carriage movement, but instead thereof, pawl means are provided on each carriage, where warps are stiff.

So in FIG. 6, the carriage 20 is provided with vertical end plates 55 which extend away from the carriage 20', and said carriage 20' is provided with similar end plates 55' which extend away from the carriage 20. Said plates 55 joined by the cross bars 56 which in turn are joined by the pieces 57, serve as a frame to support the horizontal shaft 58 across the machine, on which shaft there are the independently swingable pawls 59 in spaced relation therealong so that each pawl shall engage a warp wire 16 respectively. Tubular members 60 on said shaft 58, serve to hold said pawls in proper spaced relation. Such framework also supports the bar 61 below and along said shaft, on which bar, warp wire supports as 62 are mounted, one for supporting each warp wire 16 along a groove 63 therein. Identical equipment is provided across the plates 55' on the carriage 20', but here the parts corresponding to those on the carriage 20, are indicated by like numerals primed respectively.

It is to be noted that the tooth 64 of each of the pawls 59 and the tooth 64' of each of the pawls 59', engages a warp wire to clamp it securely to the support 62 such wire rests on when the carriage such pawl is on moves towards the discharge end of the machine, but the pawl tooth merely "rides" on the warp wire when said carriage moves towards the intake end of the machine. As to each pawl, the distance between its shaft axis to a wire resting on the support 52 is less than the distance from said shaft axis to the engaging tooth edge of the pawl tooth 64. Although I have referred here to the pawls on the carriage 20, the same applies to the pawls on the carriage 20'. Each of the pawls is biased by a spring 65 to urge the pawl tooth towards the intake end of the machine.

To properly position and hold a weft wire 17 on the carriage when such wire is ejected from a hopper, I provide the notched fingers 66 which are insulatedly mounted on the members 31 and serve as a cam to properly position such newly ejected weft wire. These fingers are provided on both carriages.

This invention is capable of numerous forms and various applications without departing from the essential features herein disclosed. It is therefore intended and desired that the embodiments herein shall be deemed merely illustrative and not restrictive and that the patent shall cover all patentable novelty herein set forth; reference being had to the following claims rather than to the specific description herein to indicate the scope of this invention.

I claim:

1. In a machine for making wire mesh in which transverse wires are laid across a series of spaced warp wires and secured thereto, a frame, means on the frame for supporting a series of wires coming to the front end of the machine from off sources of supply, in a predetermined spaced parallel relation along said frame, to the rear end of the machine, to constitute the warp for the mesh to be made, two carriages, each positioned across said frame and arranged thereon for movement along the warp, means for continuously reciprocating said carriages along said frame so that said carriages move always in opposite directions from prescribed locations on the frame where said carriages are closest to each other, to prescribed locations on the frame respectively, where said carriages are furthest apart between the front and rear ends of the machine, means on each of the carriages respectively, which when actuated will secure a transverse wire to the warp wires, means on each of the carriages respectively to support the warp wires for longitudinal sliding movement when warp wires are set on the machine to extend constantly across both said carriages, means on each carriage respectively, operating to clamp thereto, wire from amongst the wire on said carriage, so that the warp wires are moved by and only during the movement of each carriage respectively towards the rear end of the machine and means to operate the respective transverse wire securing means in a predetermined timed relation with respect to the relative positions of the carriages, to secure a transverse wire to the warp wires only during at least part of the movement of each carriage respectively towards the rear end of the machine.

2. A machine as defined in claim 1, including two means on the machine, adapted when actuated, to feed one transverse wire at a time onto and across the warp wires at the respective regions where the warp wires are supported on the carriages respectively when a carriage is at the end of its travel towards the front end of the machine; each of said feeding means being actuated in proper timed relation by the movement of the carriages respectively.

3. A machine as defined in claim 1, wherein the movement of each carriage is a simple harmonic motion.

4. A machine as defined in claim 1, wherein the lengths of travel of the carriages are identical and each such length is the distance when the carriages are nearest each other, as measured between the lines on the carriages where transverse wires are to be laid thereon during the operation of the machine.

5. A machine as defined in claim 1, including means to adjust the scope of movement of the carriages.

6. A machine as defined in claim 1, wherein the clamping means on each carriage respectively, comprises pawl means swingably mounted on each carriage respectively and support means for the warp wires, mounted on each carriage opposite the pawl means thereon; each of said pawl means being biased and arranged to clamp warp wires to said support means, only while the carriage such pawl and support means are on, moves towards the rear end of the machine.

7. A machine as defined in claim 6, wherein the pawl means on each carriage constitutes a separate, independently swingable pawl for each of the warp wires respectively.

8. A machine as defined in claim 1, wherein the means on each carriage to secure a transverse wire to the warp wires, comprises the electrodes of an associated electrical welding apparatus.

9. A machine as defined in claim 8, wherein the welding electrodes constitutes also the clamping means on said carriages respectively.

References Cited in the file of this patent

UNITED STATES PATENTS

| | | |
|---|---|---|
| 633,214 | Perry | Sept. 19, 1899 |
| 1,093,297 | Southwick | Apr. 14, 1914 |
| 2,736,347 | Kaunitz | Feb. 28, 1956 |